T 864023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1407

812,883

SAFELIGHT TOLERANCE OF RADIOGRAPHIC EMULSIONS BY ADDITION OF ORGANIC THIOETHERS

William Wendell Rees, % Kodak Park Division, Rochester, N.Y. 14650

Filed Apr. 2, 1969. Published July 29, 1969
Int. Cl. G03c *1/36, 1/34*
U.S. Cl. 96—101
No Drawing. 7 Pages Specification

Improved safelight tolerance is achieved in a radiographic silver halide emulsion by adding to said emulsion an organic thioether which, when utilized in an aqueous solution (60° C.) at 0.02 molar concentration, is capable of dissolving more than twice the amount by weight of silver chloride than that which can be dissolved by water at 60° C. The practice of the invention results in radiographic films which can be easily handled and processed under safelight lighting without substantially affecting the other photographic properties.

Safelight safety improvements are obtained by adding the organic thioethers during any of the digestion steps or as an addendum before coating. Organic thioether compounds useful in the practice of the invention include any of those which contain at least one moiety wherein sulfur and oxygen atoms are separated by an ethylene radical (e.g., —O—$CH_2CH_2$—S—). Examples of suitable organic thioether compounds include 1,10-dithia-4,7,13,16-tetraoxacyclooctadecane, 1,8 - dihydroxy-3,6-dithiaoctane, 4,10-dithiatridecane-1,13-diol and the like.